United States Patent [19]

Jennings

[11] 3,836,179
[45] Sept. 17, 1974

[54] TRAILER CHOCK

[76] Inventor: Donald G. Jennings, 133 Decker Ave., Staten Island, N.Y. 10302

[22] Filed: Apr. 23, 1973

[21] Appl. No.: 353,345

[52] U.S. Cl............. 280/476, 280/418, 280/423 A
[51] Int. Cl............................................ B62d 53/04
[58] Field of Search............ 280/415 B, 418, 405 A, 280/423 A, 476

[56] References Cited
UNITED STATES PATENTS

| | | | |
|---|---|---|---|
| 2,733,931 | 2/1956 | Reid et al. | 280/421 X |
| 2,919,928 | 1/1960 | Hoffer | 280/423 A X |
| 3,163,306 | 12/1964 | Bennett et al. | 280/423 A X |
| 3,169,012 | 2/1965 | Fagan | 280/415 B X |
| 3,413,015 | 11/1968 | Fontaine | 280/415 B |

*Primary Examiner*—Leo Friaglia
*Attorney, Agent, or Firm*—Peter L. Tailer

[57] ABSTRACT

A chock to secure a trailer at a loading dock has a frame supported by road wheels, a fifth wheel on the frame to mount the front of a trailer, pony wheels in front of the road wheels to support the front of the frame, and a king pin extending downward from the front of the frame so that the chock can be moved by a tractor. Brakes lock the chock road wheels when tractor air pressure is removed therefrom.

1 Claim, 6 Drawing Figures

PATENTED SEP 17 1974 3,836,179
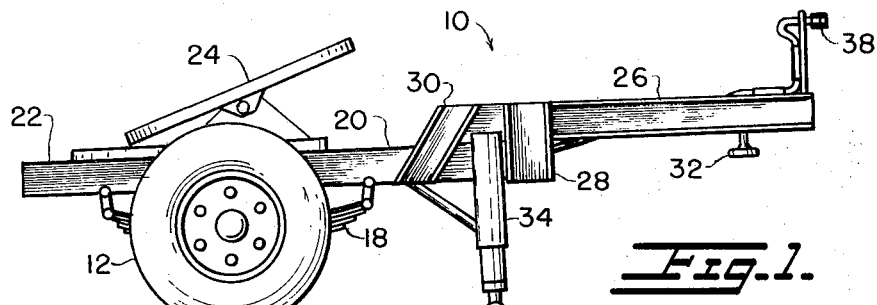
_Fig. 1._
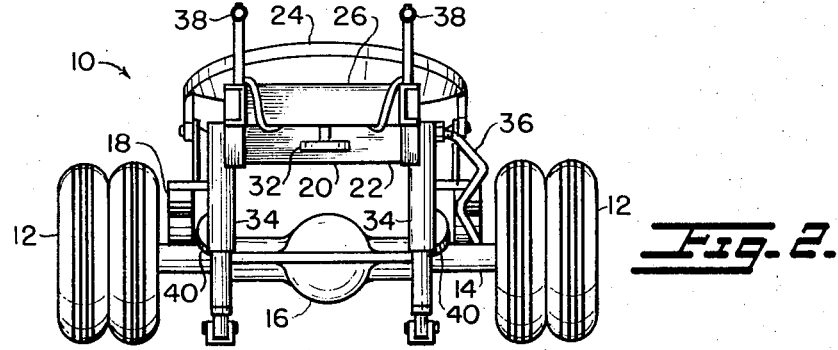
_Fig. 2._
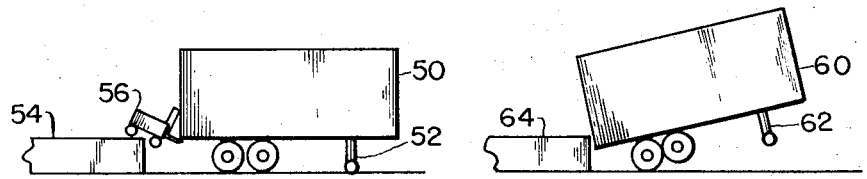
_Fig. 3._
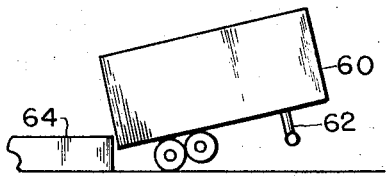
_Fig. 4._
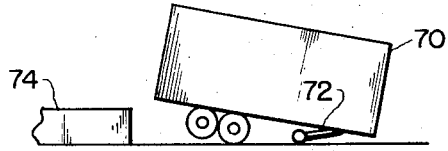
_Fig. 5._
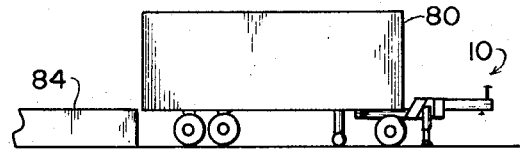
_Fig. 6._

TRAILER CHOCK

BACKGROUND OF THE INVENTION

When a trailer is in a loading dock accidents often happen because the trailer is not secured by parking it with a tractor left attached thereto. It is costly to tie up a valuable tractor by leaving it attached to a trailer to chock the trailer while it is being loaded. If a trailer is left in a loading dock on its pony wheels, a heavy fork truck driving into the back of the trailer can force down its back and raise its front, it can jar or push the trailer away from the dock, or the retractable pony wheels can collapse. This invention provides for safely chocking a trailer at a moderate cost.

SUMMARY OF THE INVENTION

A chock for securing the front of a trailer while it is in a loading dock has an axle, road wheels mounted on said axle, a frame fixed above said axle, said frame having a fifth wheel mounted over said axle to receive the king pin of a trailer, pony wheels extending downward from said frame in front of said road wheels, a king pin projecting downward from said frame in front of said pony wheels to engage the fifth wheel of a tractor to move said chock, and air brakes on said axle which lock said road wheels when air pressure from a tractor is removed therefrom.

The chock of this invention is relatively inexpensive, yet it substitutes for the use of a costly tractor to safely secure a trailer at a loading dock. Unlike a costly tractor it is tamperproof and does not provide an attractive nuisance to workers as a place to sit or smoke or from which to steal parts.

BRIEF DESCRIPTION OF THE DRAWING

FIG. 1 is a side view of a trailer chock according to this invention;

FIG. 2 is a front view of the trailer chock;

FIGS. 3, 4 and 5 are side views of trailers at loading docks showing accidents that can happen when trailers are only supported by their pony wheels; and FIG. 6 shows a trailer at a loading dock secured by the trailer chock of this invention.

DESCRIPTION OF THE PREFERRED EMBODIMENT

As shown in FIGS. 1 and 2, a trailer chock, generally designated by the reference numeral 10, has a pair of double road wheels 12 mounted on a conventional tractor rear axle 14. Axle 14 may have its differential gears in housing 16 removed if desired. Housing 16 may then be filled with concrete to add to its weight. Conventional tractor springs 18 support frame 20 which has a lower rear portion 22.

Rear portion 22 mounts the springs 18 and also has mounted on it a standard fifth wheel 24 to receive the king pin (not shown) of a trailer. The center of fifth wheel 24 should be substantially over axle 14 or in front of it. Frame 20 has a higher front portion 26 secured to project in front of portion 22 by means of the side braces 28 and 30. Front portion 26 has a king pin 32 extend down from it to be engaged by the fifth wheel of a tractor (not shown) so that chock 10 can be moved and maneuvered by a tractor. Between the braces 28 and 30 there is fixed a set of retractable pony wheels 34 which may be raised or lowered by means of a crank 36. Pony wheels 34 may have wheels or pads as in conventional practice.

Air connections 38 are connected to the air brake cylinders 40 on axle 14. Cylinders 40 apply the brakes to road wheels 12 unless a tractor air supply is available to release them.

The chock of this invention is relatively inexpensive to manufacture as it uses conventional elements that are easily obtained and welded together. Each chock 10 which is used frees a tractor for other purposes.

As shown in FIG. 3, a trailer 50 on pony wheels 52 at dock 54 may be pushed or jarred from dock 54 to cause a serious accident to the operator of a fork truck 56. In at least one instance, death has resulted from an accident of this type. As shown in FIG. 4, a trailer 60 on pony wheels 62 backed to loading platform or dock 64 may be pivoted to raise its empty front end as a heavy fork truck first drives into it. As shown in FIG. 5, a trailer 70 at loading platform or dock 74 may be subject to a serious accident if its pony wheels 72 collapse on loading.

As shown in FIG. 6, the chock 10 of this invention used with a trailer 80 at dock 84 prevents the foregoing types of accidents.

While this invention has been shown and described in the best form known, modifications may be made without departing from the spirit of the invention.

What is claimed is:

1. A chock to secure a trailer for loading, said chock comprising, in combination, a conventional tractor rear axle having a differential housing with its differential removed, concrete providing weight in said housing, road wheels on said axle, a frame of generally rectangular configuration having a lower rear portion and a stepped higher front portion extending over and welded to said lower rear portion, springs mounting said lower portion of said frame above said axle, a fifth wheel mounted on said rear portion of said frame substantially above said axle to secure the front of a trailer, conventional trailer pony wheels fixed and welded on said frame in front of said axle and said fifth wheel on each side of said frame where said front portion extends over said rear portion, a king pin extending downward from the front of said higher portion of said frame in front of said pony wheels, air brake cylinders on said axle braking said road wheels, and air connection means on said front portion of said frame connected to said cylinders, said cylinders braking said road wheels unless air is supplied thereto through said air connection means.

* * * * *